United States Patent [19]
Harney et al.

[11] Patent Number: 5,245,420
[45] Date of Patent: Sep. 14, 1993

[54] CATV PAY PER VIEW INTERDICTION SYSTEM

[75] Inventors: Michael Harney, Atlanta; Himanshu R. Parikh, Lawrenceville; Lamar E. West, Jr., Maysville; James O. Farmer, Lilburn; Mark E. Schuttte, Sugar Hill, all of Ga.

[73] Assignee: Scientific-Atlanta, Inc., Norcross, Ga.

[21] Appl. No.: 625,901

[22] Filed: Nov. 27, 1990

[51] Int. Cl.⁵ .................... H04H 1/02; H04N 7/10
[52] U.S. Cl. .................................. 358/86; 455/4.2; 455/5.1; 455/6.2; 358/84
[58] Field of Search ............... 455/2, 3, 4, 5, 6, 3.7, 455/3.3, 4.1, 4.2, , 5.1, 6.2; 371/69.1; 358/84, 86, 142; 381/10, 20

[56] References Cited

U.S. PATENT DOCUMENTS

| | | |
|---|---|---|
| Re. 31,639 | 7/1984 | Nicholson . |
| 3,755,737 | 8/1973 | Eller . |
| 3,760,097 | 9/1973 | Burroughs et al. . |
| 3,886,454 | 5/1975 | Oakley . |
| 3,896,262 | 7/1975 | Hudspeth et al. . |
| 3,899,633 | 8/1975 | Sorenson et al. . |
| 3,989,887 | 11/1976 | Murphy . |
| 4,039,954 | 8/1977 | den Toonder . |
| 4,085,422 | 4/1978 | Niwata et al. . |
| 4,245,245 | 1/1981 | Matsumoto et al. . |
| 4,317,213 | 2/1982 | DiLorenzo . |
| 4,326,289 | 4/1982 | Dickinson . |
| 4,343,042 | 8/1982 | Schrock et al. . |
| 4,358,672 | 11/1982 | Hyatt et al. . |
| 4,367,557 | 1/1983 | Stern et al. . |
| 4,430,669 | 2/1984 | Cheung . |
| 4,434,436 | 2/1984 | Kleykamp et al. . |
| 4,450,477 | 5/1984 | Lovett .................... 358/142 |
| 4,450,481 | 5/1984 | Dickinson ................. 455/5 |
| 4,461,032 | 7/1984 | Skerlos . |
| 4,521,809 | 6/1985 | Bingham et al. . |
| 4,541,095 | 9/1985 | Vries ....................... 371/69.1 |
| 4,550,341 | 10/1985 | Naito . |
| 4,577,224 | 3/1986 | Ost . |
| 4,606,041 | 8/1986 | Kadin ...................... 371/69.1 |
| 4,651,204 | 3/1987 | Uemura . |
| 4,673,976 | 6/1987 | Wreford-Howard . |
| 4,684,980 | 8/1987 | Rast et al. . |
| 4,685,131 | 8/1987 | Horne . |
| 4,686,564 | 8/1987 | Masuko et al. . |
| 4,710,955 | 12/1987 | Kauffman . |
| 4,710,956 | 12/1987 | Rast . |
| 4,716,588 | 12/1987 | Thompson et al. . |
| 4,737,990 | 4/1988 | Kaneko . |
| 4,739,510 | 4/1988 | Jeffers et al. . |
| 4,740,835 | 4/1988 | Nishibori et al. . |
| 4,754,426 | 6/1988 | Rast et al. . |

(List continued on next page.)

FOREIGN PATENT DOCUMENTS 59-61384 4/1984 Japan .
WO81/02961 10/1981 PCT Int'l Appl. .

OTHER PUBLICATIONS

"TGT-The Affordable Solution", AM Cable TV Industries, Inc.
"Addressable Tap IT-1-SM", Control Com Inc.
The "Tier Guard" System, E-Com Corporation.

*Primary Examiner*—Reinhard J. Eisenzopf
*Assistant Examiner*—Lisa Charouel
*Attorney, Agent, or Firm*—William A. Marvin; Frederick W. Powers, III

[57] ABSTRACT

An off premises CATV system is disclosed. A headend transmits programming including pay-per-view programming and a cable distribution system distributes the programming. An off premises unit is coupled to the cable distribution system for supplying the programming to at least one subscriber. A subscriber terminal is coupled to the off premises unit over a communication link. The subscriber terminal including an input device for inputting subscriber-supplied signals indicative of a pay-per-view event to generate a message. A transmitter responsive to the subscriber-supplied signals transmits the message to the off premises unit over the communication link. The message is transmitted at a plurality of random times within a predetermined period of time.

15 Claims, 7 Drawing Sheets

U.S. PATENT DOCUMENTS

| | | |
|---|---|---|
| 4,769,838 | 9/1988 | Hawegawa . |
| 4,771,458 | 9/1988 | Citta et al. . |
| 4,792,971 | 12/1988 | Uemura . |
| 4,792,972 | 12/1988 | Cook, Jr. . |
| 4,825,468 | 4/1989 | Ellis . |
| 4,837,820 | 6/1989 | Bellavia, Jr. . |
| 4,841,569 | 6/1989 | Wachob . |
| 4,864,614 | 9/1989 | Crowther . |
| 4,912,760 | 3/1990 | West, Jr. et al. . |
| 4,947,429 | 8/1990 | Bestler et al. .......................... 358/84 |
| 4,963,966 | 10/1990 | Harney et al. . |

CATV PAY PER VIEW INTERDICTION SYSTEM

TECHNICAL FIELD

The present invention generally relates to a CATV interdiction system and, more particularly, to a CATV interdiction system having impulse pay-per-view (IPPV) features.

BACKGROUND OF THE INVENTION

In conventional CATV systems, certain premium channels may be offered to authorized subscribers for an additional monthly fee or on a selective basis through the implementation of so-called impulse pay-per-view (IPPV) technology. Various techniques have been developed in order to ensure that events carried on these premium channels are available only to those subscribers authorized to receive the events. One technique developed for premium channel control is an interdiction system in which an interfering signal is introduced into the television signal at a subscriber's location. Such an interdiction system is described in U.S. Pat. No. 4,912,760. A typical interdiction system includes a pole-mounted unit located outside or "off" the subscriber's premises and which is designed to serve at least one and up to four or more subscribers. The unit contains at least one microprocessor controlled oscillator and switch control electronics to secure several premium television channels. Control is accomplished by injecting an interfering or jamming signal into unauthorized channels from the pole-mounted unit. To improve efficiency and to save costs, one oscillator may be used to jam several premium television channels. This technique reduces the amount of hardware required and maximizes system flexibility. The oscillator output jamming signal frequency is periodically moved from channel to channel. Consequently, the oscillator is frequency agile and hops from jamming one premium channel frequency to the next.

One advantage of interdiction systems is a ready access by a cable operator to the equipment since entry into a subscriber's house is not necessary. Further, since the interdiction unit is located outside a subscriber's premises, pirates have reduced opportunity to examine and effect changes to system circuitry in attempts to defeat the premium channel controls implemented by the system operator. Finally, costs may be reduced since a single interdiction unit may serve a plurality of subscribers.

However, in most, if not all CATV systems, situations arise when it is desirable or necessary to provide a return or reverse path from a particular subscriber to a headend. A number of special services may be realized over a cable television distribution plant if a reverse path is provided. Such services include remote utility meter reading, fire and burglar alarm, energy management, home shopping, subscriber polling or voting, educational and pay-per-view television services. However, in the 1970's and 1980's the preponderance, if not most, of subscriber service providing equipment was physically located on the subscriber's premises. Consequently, little attention was paid to a problem of providing reverse path transmission in an off-premises subscriber equipment environment, such as exists in a CATV interdiction system.

One situation in which some type of reverse path is needed for interdiction systems is in pay-per-view and impulse pay-per-view technology. This technology allows a subscriber to choose a presentation such as a first-run movie or a prize fight on a selective basis when the subscriber desires to view such an event. In many CATV systems, a pay-per-view event is ordered through the use of telephone calls from subscribers to the cable operator who then authorizes the subscriber to receive the event, usually by sending an authorization signal which activates a descrambler in a set top converter or terminal used by the subscriber. Since time is required to allow the cable operator to program the set top converters to allow viewing of the event, the event must be ordered well in advance of the time that they are broadcast in order to ensure reception. Other systems utilize the set top converter as a subscriber interface. The set top converter is tuned by the subscriber to select the premium channel, then the subscriber enters his or her authorization number. The set top converter then activates its descrambler to allow the broadcast on the selected premium channel to be received. Information regarding the purchase is stored in the set top converter. The converter interface is provided with telephone connection circuits which place calls to the cable operator (or reverse path RF transmitters which transmit to the cable operator) and transfer data as to the pay per view events which were selected. Although such set top converters interfaces provide IPPV capability, they are not suitable when, instead of set top converters, off premises equipment deliver broad band signals to the subscribers. The off premises equipment has no knowledge of which channel the subscriber is watching and cannot relay billing information to the cable operator as to the events which have been selected.

Commonly assigned, copending application Ser. No. 612,933, entitled "CATV System Enabling Access to Premium (Pay-Per-View) Program Events By Bar Code Data Entry" filed Nov. 13, 1990, (Attorney Docket No. A-317) discloses a system in which programs of events broadcast on premium channels of a CATV system may be purchased by means of a bar code entry terminal. However, the bar code entry terminal on the subscriber premises is a complex device which must read bar code symbols and be capable of two-way communication with the off-premises equipment. Complex devices on the subscriber premises compromise the cost savings achieved with an interdiction system.

SUMMARY OF THE INVENTION

Accordingly, it is an object of the present invention to provide a method and apparatus for permitting subscribers in a CATV interdiction system to view impulse pay-per-view events and transfer billing information to a headend.

It is another object of the present invention to provide a subscriber terminal which allows a subscriber to make IPPV purchases and which is simple in construction.

In accordance with the present invention, a subscriber terminal for use in an off premises CATV system with impulse pay-per-view capability is provided. The CATV system includes a headend, a cable distribution system, and an off premises unit coupled to the subscriber terminal over a communication link. The subscriber terminal includes an input device for inputting subscriber-supplied signals indicative of a pay-per-view event to generate a message and a transmitter responsive to the subscriber-supplied signals for transmitting the message to the off premises unit over the communication link.

Also in accordance with the present invention, an off premises CATV system is disclosed. A headend transmits programming including pay-per-view programming and a cable distribution system distributes the programming. An off premises unit is coupled to the cable distribution system for supplying the programming to at least one subscriber. A subscriber terminal is coupled to the off premises unit over a communication link. The subscriber terminal including an input device for inputting subscriber-supplied signals indicative of a pay-per-view event to generate a message. A transmitter responsive to the subscriber-supplied signals transmits the message to the off premises unit over the communication link. The message is transmitted at a plurality of random times within a predetermined period of time.

Also in accordance with the present invention, a method of providing impulse pay-per-view capability in a CATV system is provided. The CATV system includes a headend, a cable distribution system, an off premises unit, and a subscriber terminal coupled to said off premises unit over a communication link. The method includes the steps of inputting subscriber-supplied signals indicative of a pay-per-view event into the subscriber terminal to generate a message and transmitting the message to the off premises unit over the communication link in response to the input of the subscriber-supplied signals.

DETAILED DESCRIPTION OF THE PREFERRED EMBODIMENT

The reverse path data transmission system of the present invention will be discussed in the context of the off-premises cable television channel interdiction apparatus disclosed in U.S. Pat. No. 4,912,760, the disclosure of which is herein incorporated by reference in respect to those features not described by the present specification. The present invention is not limited to reverse path data transmission apparatus for an interdiction system but is also applicable to such apparatus provided generally in any off-premises system, for example, positive and negative trap systems, sync suppression systems and in any other system in which service is provided to a plurality of subscriber units from an off-premises site.

A detailed discussion of the interdiction system in which the present invention may be implemented is also provided in U.S. Pat. No. 4,963,966, also incorporated herein by reference as to essential subject matter. Furthermore, application Ser. Nos. 446,695; 498,084; 612,933; 618,745; and U.S. Pat. No. 5,045,816, also incorporated herein by reference, disclose details of radio frequency data return and on- and off-premises apparatus related by subject matter to the present invention. Topics related to interdiction systems such as jamming signal gain and frequency control will not be addressed in detail herein.

Figure 1:
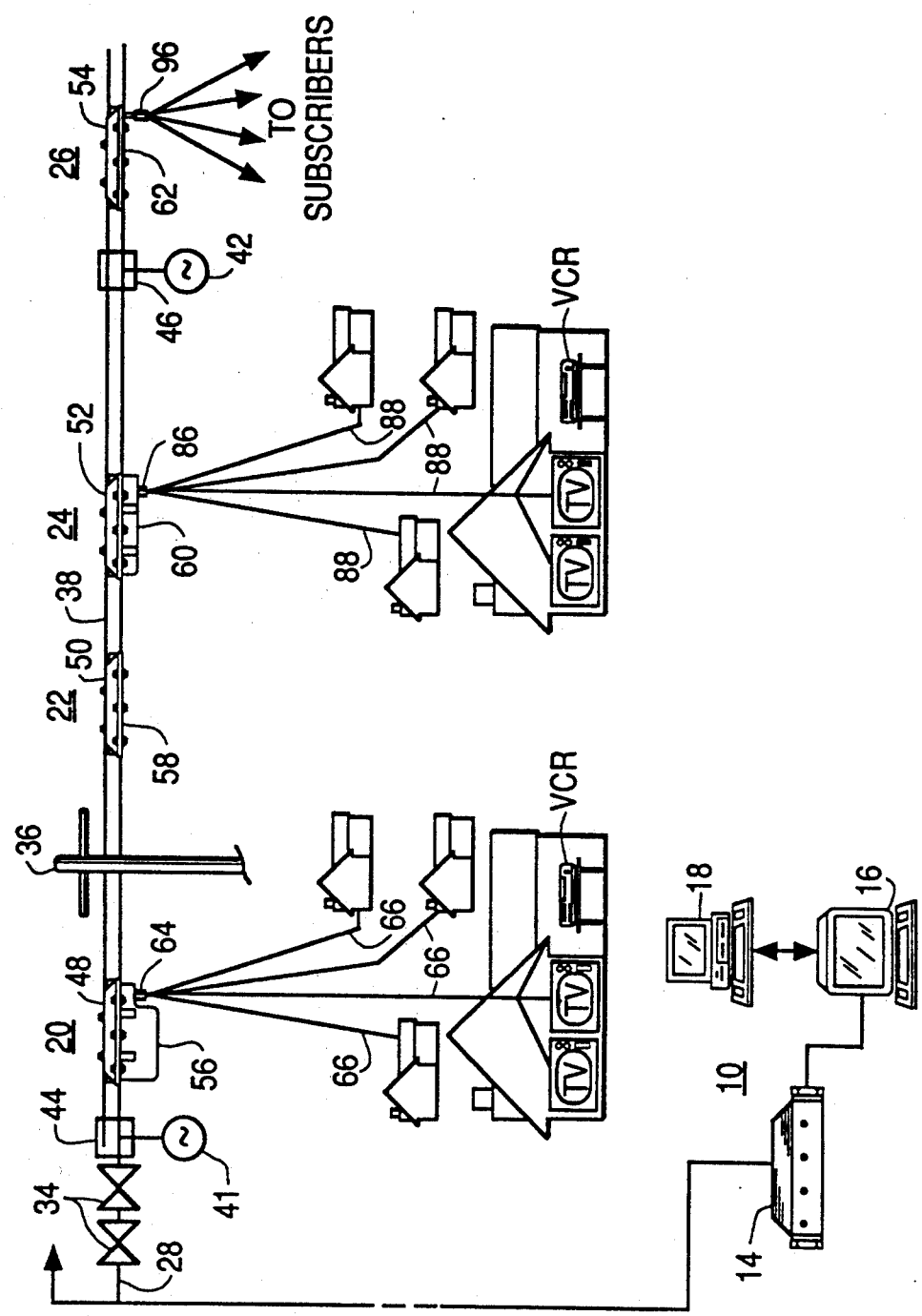
FIG. 1 is an overall system block diagram of a typical two way cable distribution plant showing an off- or on-premises cable television system including two way distribution amplifiers 34 in which system the present off-premises CATV impulse pay per view system may be implemented, i.e. an interdiction cable television system.

FIG. 1 is a general block diagram of a cable television system. Cable television system as used herein refers to all systems involving the transmission of television signals over a transmission medium (fiber optic cable or coaxial cable) to remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber as used herein refers to either a private subscriber or a commercial user of the cable television system.

Headend 10 is a connecting point to a serving cable or trunk 28 for distributing television channels over feeder lines to drops 66, 88 and finally to subscriber locations. For reference purposes, an Electronic Industries Association (E.I.A.) standard cable television frequency allocation scheme is employed and referred to herein. However, by means of the following disclosure of the present invention, one may apply the principles to other known standard or non-standard frequency allocations. Further, a National Television Subcommittee (N.T.S.C.) standard composite television signal at baseband is generally considered in the following description. However, the principles of the present invention apply equally to other standard and non-standard baseband standard definition and proposed high definition television signal formats. Also, the principles of the present invention are not limited to television services furnished from a headend but may include utility meter reading, burglar alarm reporting, digital or other stereophonic audio delivery systems, video or telephonic services and the like.

Headend 10 typically comprises a source of television programming (not shown). The television program source may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 28 and subsequently over feeder lines and, then, drop lines 66, 88. Addressing to provide different levels of service is obtained with a computer system including a system manager computer 16 and a billing computer 18.

Conventionally, trunk line 28, feeder lines, and drop lines 66, 88 are constructed of coaxial cable. For higher performance, any one of these lines could be a fiber optic cable. Due to the cost of the installation and the need for a high quality initial transmission from headend 10, trunk line 28 is typically the only line constructed of fiber optic cable.

Program material provided by the source may be premium or otherwise restricted or desirably secured from receipt at unauthorized receiver locations. It may be provided over any channel of the 50-550 MHz (or larger band) cable television spectrum. "Premium channel" or "premium programming" as used herein refers to a channel or program which is secured from unauthorized receipt either because of its premium or restricted status.

Normally, all premium programming in cable television systems is scrambled. However, in accordance with interdiction system technology, premium programming is transmitted in the clear, and interdiction is applied as at off-premises interdiction apparatus 20 to jam reception of unauthorized premium programming. Off-premises apparatus 20, 22, 24, and 26 also form part of a reverse data transmission path as will be discussed in greater detail below. Off premises apparatus 20, 22, 24, and 26 respectively comprise housings or enclosures 56, 58, 60, and 62 and covers 48, 50, 52, and 54.

It is likely that cable systems will gradually make the transition to an interdiction system, for example, as new subscribers are added. During a transition period, headend 10 may provide scrambled television programming as well as premium programming in the clear and a scrambler may be provided as long as converters/decoders remain in the system for unscrambling scrambled program transmission. For example, off premises apparatus 24 may be coupled to subscribers still having on-premises converters/decoders and off premises unit 22 may be utilized to couple new subscribers to the system. In certain instances, converter/decoders at subscriber locations may later be entirely replaced by interdiction apparatus of the present invention. Descrambling or decoding equipment may also be provided at an off-premises housing.

Headend 10 includes an addressable data transmitter 14 for transmitting global commands and data downstream to all subscribers or addressed communications for reception by a particular subscriber. Such forward data transmission may be conducted over a separate data carrier from the cable television spectrum, for example, at 108.2 megahertz. Forward data transmission may also be over an unused default channel from the television spectrum. Global commands generally take the form of operation code and data while addressed communications further include the unique address of a particular subscriber.

In an alternative embodiment, forward data communications may take the form of in-band signals sent with a television channel superimposed, for example, upon an audio carrier during a special time period, for example, a period corresponding to the vertical blanking interval of the associated video signal. Such data communications further complicate data reception at interdiction apparatus and are desirably eliminated. However, in-band signaling may be required for the operation of certain converter/decoders known in the art.

Thus, commands to authorize service to a particular subscriber may be transmitted in-band or on a separate data carrier and typically involve transmitting a unique address of a particular subscriber unit, a command, and data. Decoders in the system receive the command, decode it, determine if the command is to be acted on, and if so perform the desired action such as provide a subscriber with pay-per-view credits or generally authorize services. Channel program or authorization data is transmitted via an addressable data transmitter 14 over a trunk line 28 to feeder lines with interspersed signal amplifiers 34 and power supply equipment 41, 42, 44, 46 provided as required. The serving signal is dropped via drops 66, 88 to a subscriber location at a pole 36 or from a pedestal at underground cable locations.

Off premises unit 24 may be connected via connector 86 and drop 88 to a conventional converters/decoders which serve several functions. Responsive to an addressed communication from headend transmitter 14, channel or program authorization data is updated in an authorization memory if the address associated with the addressed communication matches a unique address of the subscriber decoder. For example, the subscriber address may comprise a plurality of bits over and above the actual number of subscribers in a system, the additional bits insuring the security of the address. The premium channel or program is then stored in the authorization memory of the converter/decoder. Television programming is normally converted to an otherwise unused channel such as channel 3 or 4 of the television spectrum by a converter portion of converter/decoder. Its premium status is checked against the data stored in authorization memory. If the programming is authorized, the decoder portion of the converter/decoder is enabled to decode authorized scrambled premium programming.

The provided television receiver may be a conventional television receiver or may be a so-called cable ready television receiver. Because of the advent of cable ready television receivers, there is no longer a requirement at a subscriber premises for the converter portion of a converter/decoder because a converter is built into such television receivers.

In accordance with a cable television system provided with interdiction or other off-premises apparatus, units 20, 22, 24, and 26 are mounted on a strand 38 supporting the cable to a pole 36, or provided via a pedestal, as is shown more particularly in U.S. Pat. No. 4,963,966. The units may also be mounted indoors in an equipment closet of a multiple dwelling unit or to the side of a subscriber's premises. Inside the units is common control circuitry for tapping into the broadband television and data transmission spectrum. Referring to the pole 36, there is shown a strand-mounted apparatus 56 serving four drops 66 to subscribers via connector 64. In practice, four or more subscribers and up to four or more drops 66 may be served by interdiction apparatus 20. In addition to the common control circuitry, four or more plug-in subscriber modules may be provided for an off-premises housing. Also, according to the present invention, additional services requiring two way data transmission such as subscriber polling, home shopping, burglar alarm, energy management and pay-per-view services may be provided via four or more special service modules comprising reverse path signal combining circuitry of apparatus 56.

Desirably, all cable television equipment may be removed from the subscriber premises. However, for the provision of certain additional services, some on-premises equipment is unavoidable. In accordance with the present invention and as discussed in greater detail below, a subscriber transaction terminal apparatus in a subscriber's premises simply comprises a subscriber-controlled data transmitter for transmitting data on the subscriber drop 66 in only one direction, namely, to interdiction apparatus 20. For purposes of this description, the subscriber premises will be assumed to include at least one cable ready conventional television receiver, TV or VCR. Consequently, subscriber equipment need not comprise a tunable converter for converting a received cable television channel to an unused channel such as channel 3 or 4. The subscriber transaction terminal device comprises data entry or sensing means, data confirmation means, i.e., a display or alarm, if required, and a data transmitter coupled between the drop cable and the cable ready television receiver.

Power for off-premises apparatus 20 may be provided over the cable from the headend direction via power supplies 41, 42 or be provided via the subscriber drop 66 or by a combination of such means. Forseeably, power may be even provided by rechargeable means such as solar cells or other external or replaceable internal sources such as batteries. The subscriber transaction terminal equipment according to the invention described by the present application is preferably battery powered.

All off-premises service providing apparatus 20, 22, 24, and 26 may be secured in a tamper-resistant housing or otherwise secured as described by U.S. Pat. No. 4,963,966 or secured in a locked equipment closet of an apartment complex. If located in a place exposed to the elements, the housing should be water-tight. Also, the housing should be designed to preclude radio frequency leakage.

Interdiction apparatus 20 is uniquely addressable by headend 10 just as is a known converter/decoder. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form. Nevertheless, address security may be desirable so long as converter/decoders or other unique address requisite equipment is provided at a premises.

Interdiction apparatus 20 comprises addressable common control circuitry, a plug-in special service module and up to four (or more) plug-in subscriber modules. Upon receipt of subscriber specific premium program, subscriber credit or channel authorization data, the data are stored at memory of common control circuitry of off-premises interdiction apparatus 20.

Interdiction apparatus 20 further comprises a diplexer for providing a forward transmission path which is coupled to automatic gain control circuitry of the common control circuitry. The common control circuitry forwards jamming frequency control data to a subscriber module. Channel interdiction circuitry associated with each subscriber module then selectively jams unauthorized premium programming dropped via a particular drop 66 to a particular subscriber. Consequently, interdiction apparatus 20 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be-service pirate must attempt to remove a particular pseudo-randonly timed jamming signal placed at a varying frequency or seek to tamper with the off-premises interdiction apparatus 20 or derive a signal from shielded and bonded cables which should likewise be maintained secure from radio frequency leakage. Tamper protection for apparatus 20 is described in U.S. Pat. No. 4,963,966 and in application Ser. No. 618,687, filed concurrently herewith.

Two way data transmission is provided via a so-called sub-split frequency spectrum comprising the band 5-30 megahertz for upstream, reverse path transmission toward headend 10 and a spectrum from 54-550 megahertz for downstream forward transmission. In particular, an amplitude shift keyed data transmission signal at approximately 5 MHz is used for communication on drop 66, while a binary phase shift keyed signal is used for upstream data transmission in the T8 band to headend 10. Distribution amplifiers 34 distributed along the distribution plant according to known prior art design techniques separate and separately amplify the two transmission bands. They are distributed along the transmission path in a manner so as to preclude the carrier-to-noise ratio of either transmission path from being too low.

Also, at a headend 10, there is located a radio frequency data receiver and data processor for receiving data transmissions from the off- or on-premises subscriber equipment. Details of this equipment are more particularly provided by Application Ser. No. 07/498,084.

Figure 2:
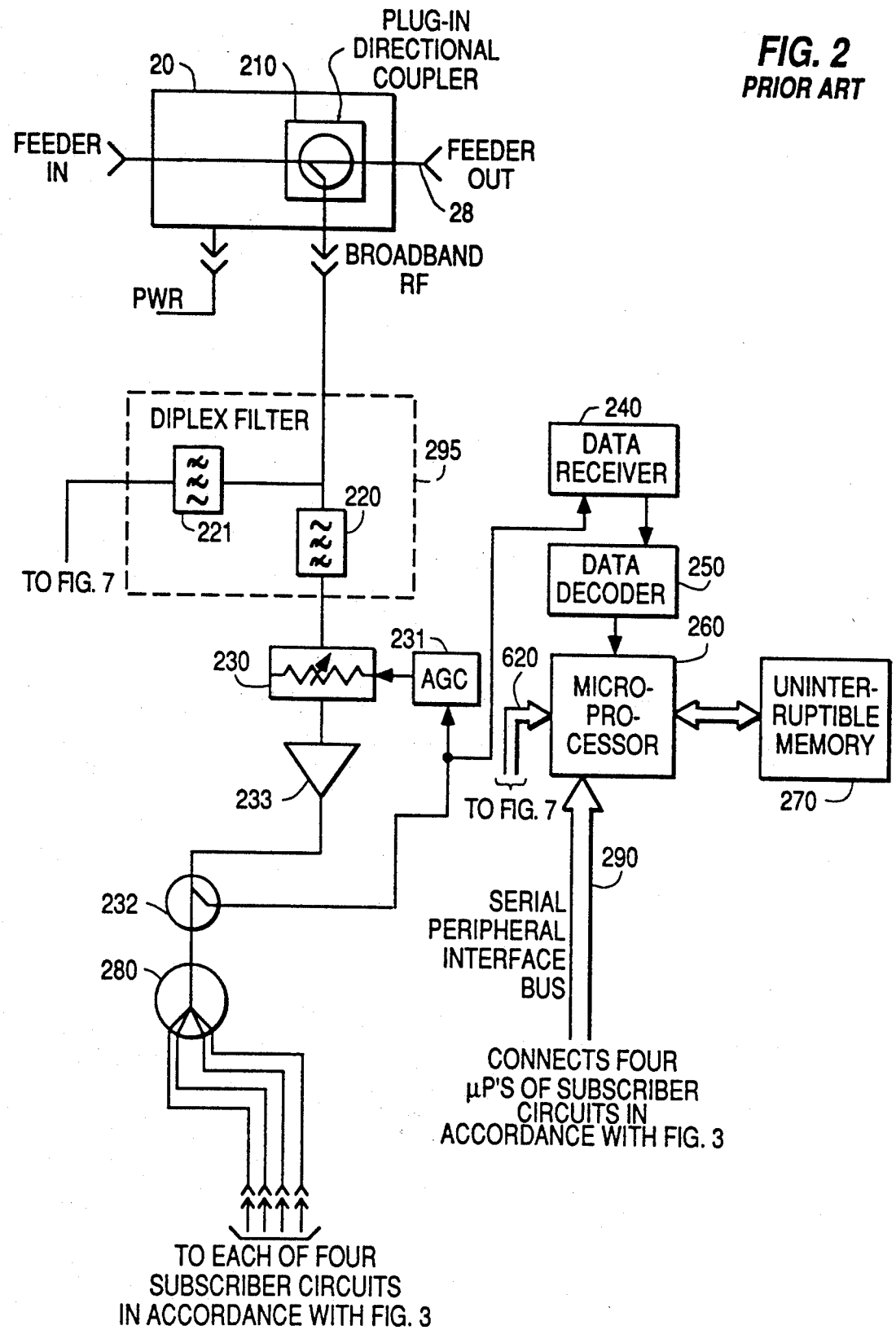
FIG. 2 is a block schematic diagram of an addressable common control circuit for a plurality of provided subscriber modules of an off-premises interdiction system comprising a broadband signal tap, a diplexer connected to the tap, a microprocessor, a data receiver and decoder, and an automatic gain control circuit.

The common control circuitry of interdiction apparatus 20 will now be described with reference to the block diagram FIG. 2 for serving four subscriber modules in accordance with the block diagram FIG. 3 and a special service modules according to FIG. 7. Referring particularly to FIG. 2, feeder cable 28 is shown entering off-premises interdiction apparatus 20 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 210 which may be in the form of a plug-in module taps into the broadband serving cable 28. A broadband of radio frequency signals is thus output to highpass filter 220 of diplex filter 295. Highpass filter 220 passes a downstream band of frequencies, for example, 54-550 megahertz comprising at least the cable television spectrum and any separate data carrier frequency, such as 108.2 MHz, and blocks the upstream band of frequencies, for example, 5-30 megahertz (in a bi-directional application). For an off-premises interdiction system, the cable television spectrum may particularly comprise a narrower frequency band from about 54 MHz to 350 MHz.

Lowpass or bandpass filter 221 passes at least the 0-30 MHz spectrum and more particularly a pass band comprising the T8 band from approximately 14-18 MHz. As will be more particularly described herein, one of twenty-three data channels may be selected for upstream data transmission from within the T8 band to avoid noisy regions of the spectrum.

Circuitry associated with broadband signal "seizure" from the distribution cable 28 may be conveniently mounted on a single board, conveniently named a seizure board of interdiction apparatus 20, more particularly described in FIG. 15 of U.S. Pat. No. 4,963,966, but described in general terms herein as at least comprising the directional coupler 210 and diplex filter 295 of FIG. 2.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The common circuitry of FIG. 2 is collocated or closely located to the subscriber modules which will be further described in connection with FIG. 3 and may be contained in the same housing with the special service units for each subscriber which will be described in connection with FIG. 6.

Also connected to directional coupler 232 is a data receiver 240 for receiving downstream forward data transmissions from the addressable data transmitter 14 located at headend 10. Data receiver 240 receives data transmitted, for example, over a data carrier of 108.2 megahertz and provides unprocessed data to data decoder 250. In accordance with an established protocol and as briefly described above, such data may be in the form of an operation code (command), a subscriber unique address and associated data. Data decoder 250 processes the data and provides the separately transmitted data to microprocessor 260 for further interpretation in accordance with a built-in algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Figure 6:
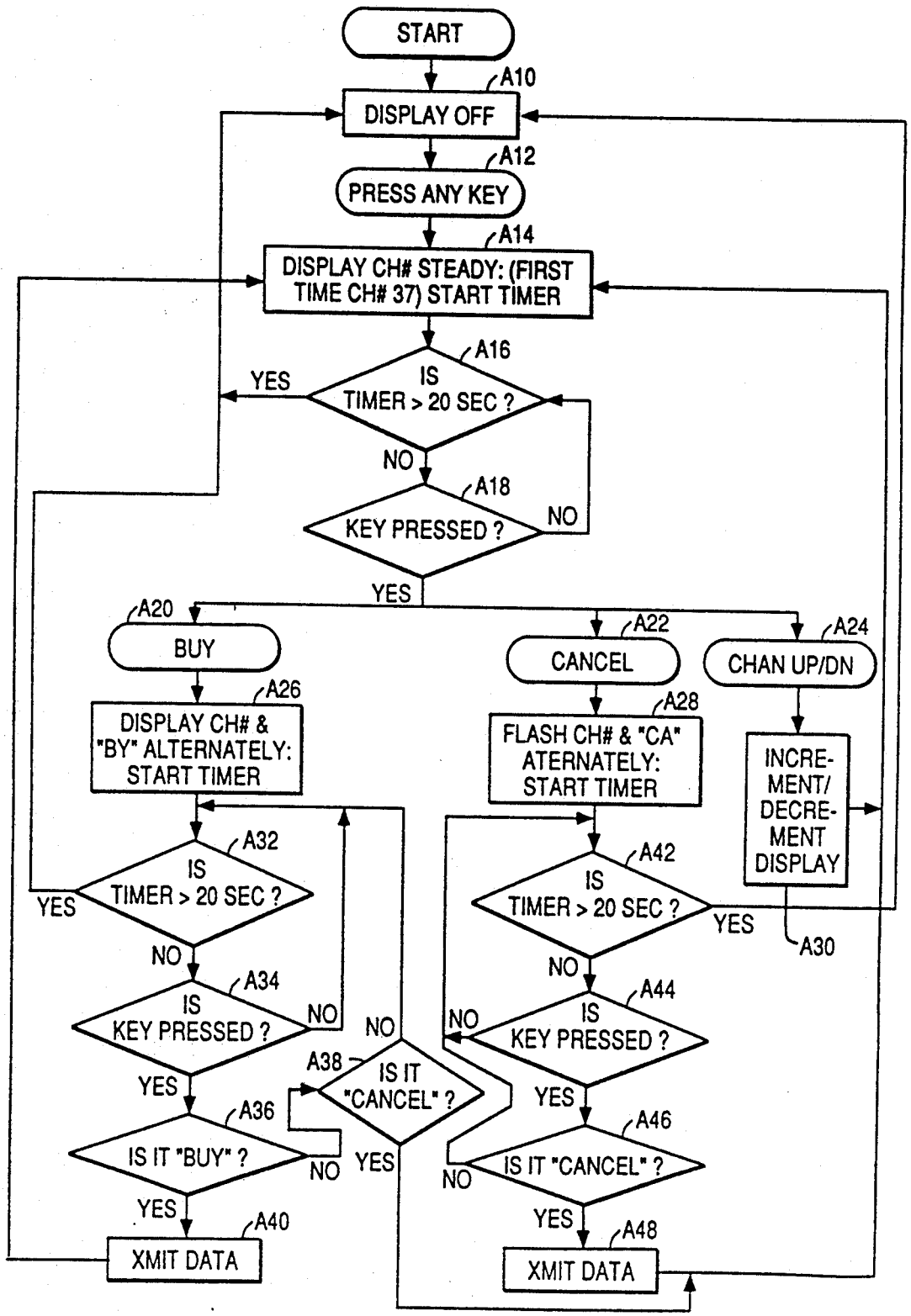
FIG. 6 is a flow diagram illustrating the steps for buying and cancelling a buy in accordance with the present invention.

Received data may be stored in uninterruptable memory 270 by microprocessor 260. Data may be stored in memory 270 and jamming frequency control data downloaded when needed to a subscriber module according to FIG. 3 via a serial peripheral interface bus 290 connecting microprocessor 260 with separate microprocessors 300 associated with each provided subscriber module as shown in FIG. 3. Furthermore, microprocessor 260 communicates, for example, upstream frequency and amplitude control data to microprocessors associated with each special service module as shown in FIG. 6 over interface 620 which may comprise the same bus system as serial bus 290. A parallel bus with bus contention among the several modules and processor 260 may be substituted as appropriate for buses 290 and 620.

Variable attenuator 230 regulates the received broadband of picture carriers to a reference level while the microprocessor 260 controls the jamming carrier level outputs of associated subscriber units within the prescribed range. Microprocessor 260 consequently interprets both global communications addressed to common control circuitry or communications addressed to unique subscribers for operation of subscriber modules such as service credit or authorization commands or both. If appropriate, microprocessor 260 ignores global or addressed communications to other interdiction apparatus or to conventional converter/decoders. An example of global communications peculiar to interdiction apparatus 20 is premium channel frequency data for each premium channel or channel over which premium programming at a particular point in time is provided via headend 10. Examples of addressed communications to common control circuitry include communications comprising premium channel or programming authorization information or communications instructing the common control circuitry to provide credit to a particular subscriber. Examples of commands for operation of special service modules in accordance with FIG. 6 may comprise commands to set transmit level and channel for upstream transmissions in the T8 band.

Figure 4:
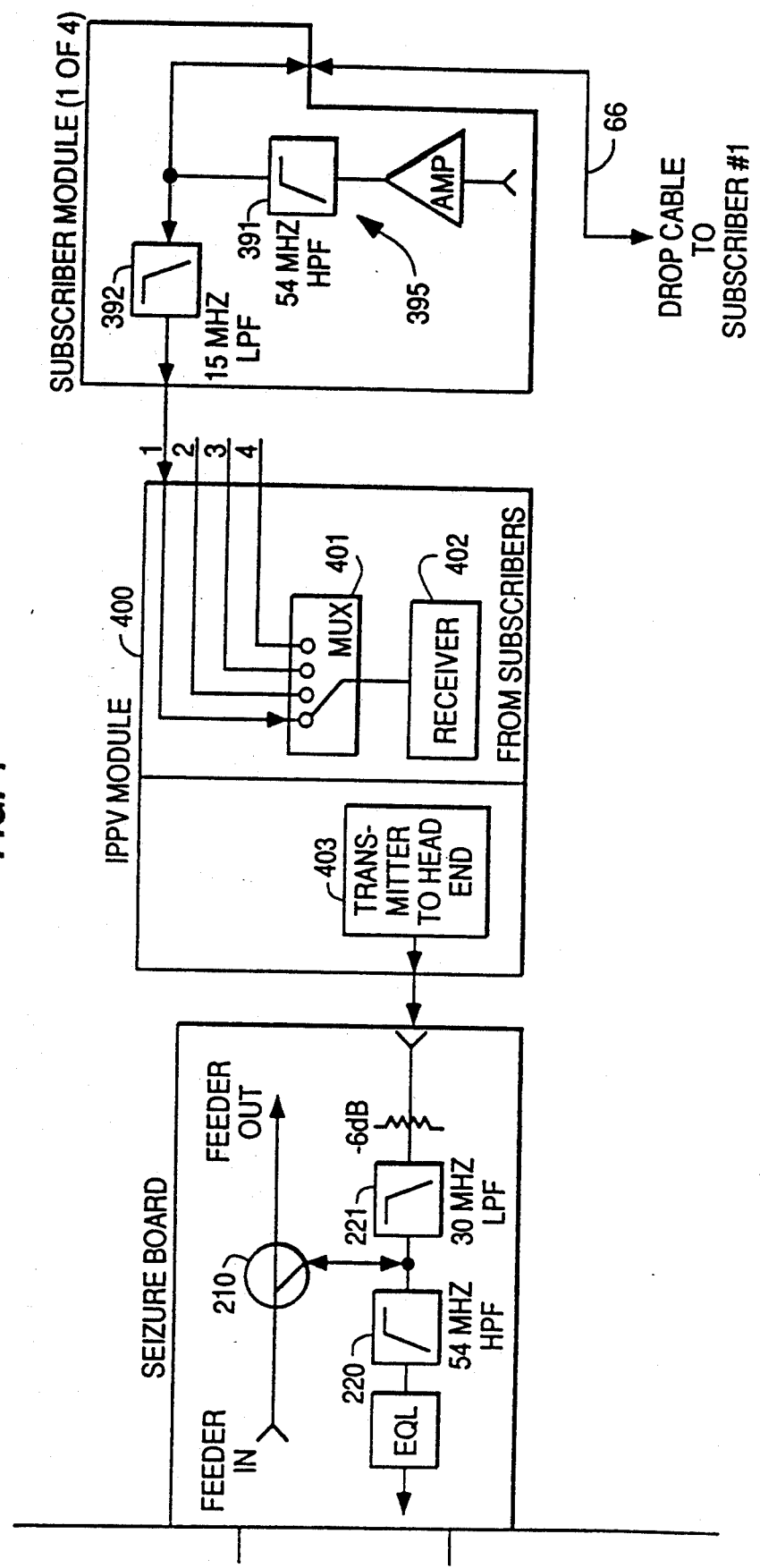
FIG. 4 is a block schematic diagram of the interrelationship between a special services module which will be described in detail in connection with FIG. 6, one of four subscriber modules according to FIG. 3 and the seizure board of common control circuitry of FIG. 2.

If two way services over the serving cable are anticipated, the radio frequency upstream transmissions from on-premises equipment are combined at a multiplexer of reverse path signal combining circuitry according to FIG. 4 for subsequent upstream transmission. A separate data transmitter is provided in the reverse path signal combining apparatus according to FIG. 4 for upstream transmissions to the headend.

Serial peripheral interface buses 290, 620 may be a two way communications link by way of which microprocessors 300 (FIG. 3) or microprocessors 600 (FIG. 6) associated with subscriber and special service modules respectively, may, at least, provide status reports to microprocessor 260 upon inquiry. Alternatively, a microprocessor of either FIGS. 3 or 6 may tap into a parallel contention-type bus 290 and bid for communication to either a microprocessor 260 of common equipment or another microprocessor 300, 600 or may directly communicate with any of the other associated microprocessors over a separate serial bus 290, 620.

Figure 3:
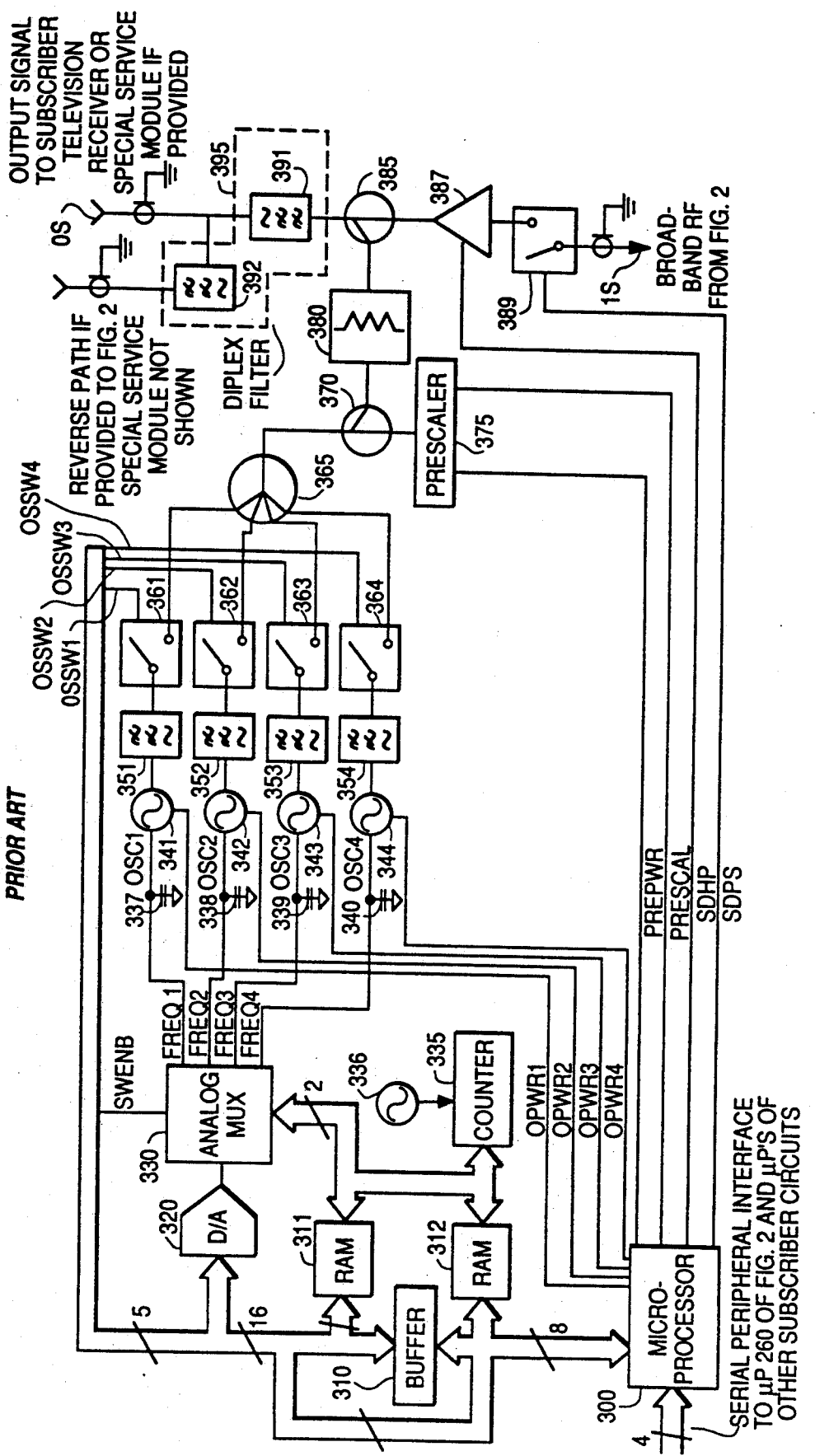
FIG. 3 is a block schematic diagram of one subscriber module of an off-premises interdiction system comprising a microprocessor 300 for selectively controlling the jamming of unauthorized services to a subscriber, associated jamming equipment and a diplexer.

Radio frequency splitter 280 provides broadband radio frequency signals comprising a broadband cable television service spectrum separately to each subscriber module according to FIG. 3 that is provided.

A reverse path is required to headend 10 or common circuitry according to FIG. 2 for special additional services. Consequently, a signal combiner 400 of a reverse path data transmission module according to FIGS. 4 and 6 is provided for receiving data communications from each of the four subscriber modules in an opposite manner to splitter 280. Certain data may be transmitted back toward the headend via an RF return path according to either FIG. 4 or 6 and a forward transmission path toward the subscriber may be provided in a conventional manner according to FIGS. 2 and 3.

FIG. 3 is an overall block schematic diagram of a subscriber module of interdiction apparatus 20 including a diplex filter 395. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 260. Consequently, microprocessor 300 may conveniently comprise a Motorola 68HC05C3 microprocessor or similar unit.

A reverse path may be provided via a lowpass filter 392 of diplex filter 395 to a special service module (according to FIGS. 4 or 6) collocated with common control circuitry as described in FIG. 2 and subscriber modules according to FIG. 3. Thus, a 5-30 megahertz or other lowpass band, more particularly, a 0-15 MHz lowpass band, may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 3 and withdrawn at terminal OS.

The broadband radio frequency television spectrum signal from FIG. 2 is provided to terminal IS. Referring to the path connecting terminal IS to terminal OS, there are connected in series a service denying switch 389, a radio frequency amplifier 387, a jamming signal combiner 385, and a high pass filter 391.

Service denying switch 389 is under control of microprocessor 300. In the event of an addressed communication from headend 10 indicating, for example, that a subscriber is to be denied service for non-payment of a bill, service denying switch 389 may be opened. In addition, a high frequency amplifier 387 may be powered down under control of microprocessor 387 whenever service is to be denied. Otherwise, amplifier 387 may be set at discrete gain levels, under microprocessor control, to provide supplemental gain to the broadband television signal if a subscriber has a plurality of television receivers (TV's and VCR's) over and above a nominal amount.

An appropriate control signal waveform output SDPS is provided by microprocessor 300 for controlling switch 389. Also the same ON/OFF control signal that is used to control the switch 389 may control the powering up and down of amplifier 387 as control signal SDHP.

Continuing the discussion of FIG. 3, jamming signals are interdicted at directional combiner 385 under microprocessor control. Because of the directional characteristic of radio frequency amplifier 387, jamming signals cannot inadvertently reach the common control circuitry of FIG. 2 or the serving cable. Highpass filter 391 of diplex filter 395 prevents any return path signals from reaching combiner 385 and passes the broadband spectrum including any jamming signals toward terminal OS. Reverse path signals, for example, in this embodiment may be radio frequency signals below 30 megahertz. The broadband television spectrum is presumed to be in the 50-550 megahertz range. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300, responsive to common microprocessor 260, controls the frequency and power level outputs of four (or five if necessary) voltage controlled oscillators 341-344, each of which oscillators jams premium channel frequencies within an allocated continuous range of frequencies. The frequency of the oscillators is set over leads FREQ1-4 in a manner described in U.S. Pat. No. 4,912,760. A power level and ON/OFF operation of the oscillators 341-344 are controlled over leads OPWR1-4.

Since premium programming may be transmitted anywhere in the cable television spectrum, the sum of all such allocated portions comprises the entire television spectrum to be jammed (even where non-premium channels are normally transmitted). Also, in accordance with the depicted interdiction system, the television spectrum to be jammed may comprise discontinuous portions or intentionally overlapping portions.

A further detailed discussion of frequency control and the interdiction system of FIGS. 1, 2, and 3 may be found in U.S. Pat. No. 5,014,309.

FIG. 4 is a block diagram of off-premises interdiction apparatus 20 of FIG. 1. One of four subscriber modules is shown and the details of the circuitry for jamming programming are omitted. Drop cable 66 from subscriber No. 1 is shown connected to high pass filter 391. Also connected to drop 66 is lowpass filter 392 having a cut-off frequency of 15 MHz for passing an amplitude shift keyed data signal centered at 5 MHz to an associated special service module 400. Lowpass filter 392 and highpass filter 391 together comprise diplexer 395 of FIG. 3.

Special service module 400, shown only in simplified form, comprises a multiplexer 401 for combining signal path inputs from each one of four subscriber modules. A receiver 402 receives the data transmissions from the subscribers, and a transmitter 403 is provided for upstream transmission, preferably in the T8 band.

The seizure board of interdiction apparatus 20 is shown also in simplified form. Directional coupler 210 is shown connected for passing a high passband via highpass filter 220 toward the subscriber while lowpass filter 221 receives the output of the data transmitter 403 of special service module 400 for transmission toward the headend. Lowpass filter 221 and highpass filter 220 together comprise diplexer 295 of FIG. 2.

One diplex filter 295 is provided between directional coupler 210 and the common circuitry. A diplex filter 395 is associated with subscriber equipment modules. In a plug-in slot of off-premises equipment 20 and coupled to each diplexer is a special service module according to FIGS. 4 and 6.

Figure 5:
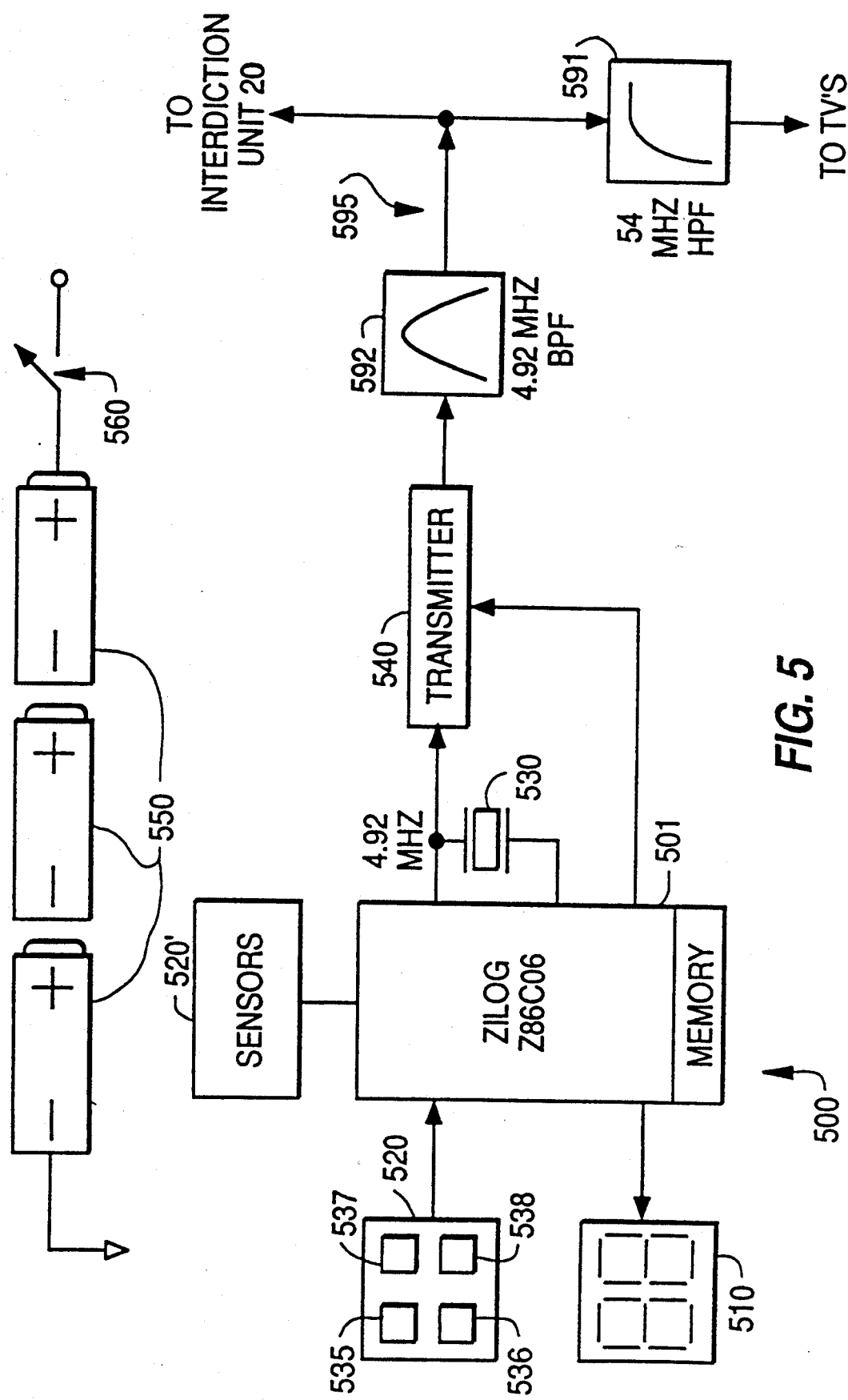
FIG. 5 is a block schematic diagram of on-premises special service transmission equipment according to the present invention, its connection being shown between the drop cable to an off-premises interdiction unit and an on-premises cable-ready television receiver, being also shown in FIG. 3.

FIG. 5 is a block diagram of a transaction terminal 500 in accordance with the present invention. The interdiction RF-VIPPV transition terminal is an interface between the subscriber and the interdiction system. Terminal 500, among other things, allows the subscriber to make impulse pay-per-view purchases. Terminal 500 includes a keypad 520 having four pushbuttons 535-538 respectively labelled "ChanUp", "ChanDn", "Buy", and "Cancel" and a two-digit LED display 510.

Transaction terminal 500 includes a microprocessor 501 such as a Zilog Z86C06 which reads the four pushbuttons 535-538, controls the two-digit LED display 510, and controls the transmission of purchase information to the interdiction unit located outside the home. When no transactions are in progress, microprocessor 501 is preferably in a low-power state and power to the rest of transaction terminal 500 is switched OFF. When any of the four buttons are pressed, microprocessor 501 is activated and power is switched ON to the rest of the terminal circuitry. When the terminal is active, microprocessor 501 controls the user and communication interfaces as described below.

Terminal 50 permits a subscriber to purchase IPPV events and to also cancel purchases within a predetermined time after buying. The interdiction unit, not the terminal 500, determines whether a cancel is permitted. When a channel is selected, the terminal makes no indication that an event is available or has been previously purchased. If no keys are pressed for twenty seconds, the terminal enters an idle state.

Pressing the "ChanDn" and "ChanUp" buttons results in the respective decrementing and incrementing of the channel display of display 510. Channels "0" through "9" are displayed as single digits. The two display digits are preferably strobed on and off so that when one digit is ON the other is OFF. The strobe rate is preferably about 100 Hz, although the invention is in no way limited in this respect. Pressing "ChanDn" when the display reads "0" results in the channel number "99" being displayed. Pressing "ChanUp" when the display reads "99" results in the channel number "0" being displayed. If the subscriber continuously presses either the "ChanUp" or "ChanDn" buttons, display 510 increments/decrements through the next three channels at a rate of 2 channels per second and then continues incrementing/decrementing the display at a rate of 4 channels per second.

Prior to the purchase of an IPPV event, the terminal is in an idle or sleep state and the display is blank. When the subscriber presses any key, microprocessor 501 controls display 510 to display "37". Preferably, terminal 500 does not display the most recent channel purchased. The subscriber then uses the "ChanUp" or "ChanDn" keys on keypad 520 to select the channel of the event to be purchased. After the channel has been selected, the subscriber presses the "BUY" button on keypad 520. Display 510 then alternately displays "bY" and the selected channel number. The subscriber then presses the "BUY" button on keypad 520 a second time. Display 510 displays the channel number and the purchase information is transmitted via transmitter 540 over a carrier synthesized by ceramic resonator oscillator 530 to the interdiction unit outside the home.

The purchase of an event may be cancelled in accordance with the following procedure. Initially, terminal 500 is in the idle or sleep state and display 510 is blank. When the subscriber presses any button on keypad 520, microprocessor 501 controls display 510 to display "37". Display 510 does not display the most recent channel purchased. The subscriber uses the "ChanUp" and "ChanDn" keys on keypad 520 to select the channel of the event to be cancelled. After the channel has been selected, the subscriber presses the "CANCEL" button on keypad 520. Display 510 then alternately flashes "CA" and the selected channel number. The subscriber then presses the "CANCEL" button on keypad 520 a second time. Display 510 then displays the channel number and the cancel information is transmitted via transmitter 540 to the interdiction unit outside the unit.

If the event is active at some other time than a current time, the subscriber will not know if he has successfully purchased the event. Since other transaction terminals will be contending for access to the same special service module according to FIG. 4 and 6 and since the subscriber may only cancel a purchase within a predetermined period of time after buying, purchasing and canceling must be assured. To afford this assurance, the buy or cancel message is transmitted by transmitter 540 periodically and at random times as further described below. After the transmitter 540 has completed its periodic and random transmissions, for example, occurring over a period of about twenty seconds, the microprocessor 501 may turn itself and its peripheral equipment OFF to conserve power. Furthermore, no record need be maintained in microprocessor 501 memory. For example, the decision to cancel a buy signal will be made at interdiction apparatus 20, and not at the transaction terminal.

In accordance with the invention, there are only two messages, buy and cancel. Both messages preferably contain an operation code, a channel number, and a checkbyte. Data transmission is ASK (Amplitude-Shift-Keyed) at 9600 baud with at least 0.1 milliseconds between bytes. The buy and cancel messages are three bytes long and each contain an operation code, the selected channel number, and a checkbyte. Each byte takes 1.0 millisecond and the time between bytes is allowed to be anywhere from 0.1 to 0.5 milliseconds, so the message length can be anywhere from 3.2 to 4.0 milliseconds long.

When a subscriber causes a buy or cancel message to be transmitted, transaction terminal 500 repeats the message until 450 milliseconds have passed. This is a first burst of messages. After each message, there is a random waiting period of between 15 and 30 milliseconds. The random waiting period is determined by a random number generating routine of microprocessor 501. The routine is seeded with an eight bit random number seed so that the probability of two transmitters choosing the same series of random numbers is 1 in 256 ($2^8$). After the first burst of messages, there are two more bursts within the next 5.0 seconds, each burst again lasting 450 milliseconds. The time between bursts is also random and based on an 8 bit seed.

Transaction terminal 500 is coupled to a diplex filter 595 between the on-premises television receiver and the interdiction apparatus at drop 66. In an alternative embodiment, the receiver of the special service module 400 and transmitter 540 of FIG. 2 need not comprise a transceiver means coupled to drop 66 but may comprise a radio frequency broadcast transmitter employing over-the-air transmission. Diplex filters 395 and 595 would then not be required. Ultrasonic, infrared or low power remote control radio frequency signal broadcast and reception apparatus could be substituted.

In any transaction terminal, it is desirable that the terminal may be self-powered or utilize a very low degree of power. The apparatus shown in FIG. 5 may be simply powered by three batteries 550 which may be replaced every year or so.

In a pay-per-view transaction terminal, it may be desirable to prevent purchases of programs. Switch 560, may be associated with a key or combination lock. For example, a combination of the four keys of keyboard 520 may unlock switch 560.

In an alternative embodiment, microprocessor 501 may read data from keypad 520 and sesor devices 520'. In a burglar alarm reporting terminal, the data entry comprises four or more bits of data digitally identifying sixteen portals or windows which may have been breached, while display 510 may be an alarm device. In a utility meter reading scheme, the sensor inputs may identify the type of meter, electric, gas, or water, and the data may be the reading itself. Other transaction terminals or a common terminal may be provided for these and other services such as home shopping, voting, etc.

In any case, the transaction terminal of FIG. 5 further comprises a transmitter 540 for, for example, providing an amplitude shift keyed output data signal, for example, at 9600 baud and comprising operation code and data, i.e. buy channel 88, alarm at portal 12, electric meter at 373 kilowatts. The output data signal is passed through bandpass filter 592 centered at 4.92 MHz toward interdiction apparatus 20. The output data signal is precluded from interfering with television reception by 54 MHz high pass filter 591.

FIG. 6 is a flow diagram illustrating a method in which a subscriber may purchase a pay per view event. The method may be implemented in software stored in the microprocessor 501 of the transaction terminal 500. The software controls the operation of microprocessor 501.

Initially, microprocessor 501 is in an idle or sleep state in which it is shut down to conserve power and display 510 is switched OFF (A-10). The microprocessor is awakened by the actuation or pressing of any key (A-12) and control passes to the main loop of the program. At block A-14, a steady channel number is displayed on display 510, for example channel 37, to provide a starting point for the subscriber. Channel 37 was chosen because it is a convenient mid-point among the presently available premium channels and reduces the number of times the "ChanUp" and/or "ChanDn" keys are pressed to reach a desired premium channel. It will be evident that any steady indication that the terminal is active can be provided on the display. A twenty second software timer is also started to initiate an active cycle. The timer may alternatively be a counter or other timing mechanism utilized in the art.

In blocks A-16 and A-18, the timer is tested to determine whether the twenty seconds has elapsed. If twenty seconds has elapsed from the initiation of the active cycle before the pressing of another key (A-18), it is assumed the subscriber has changed his mind and does not want to purchase a premium event. In such a case, the program transfers control back to block A-10 where microprocessor 501 and display 510 again enter the sleep mode.

However, if another key is pressed before the timer times out as indicated by the affirmative branch from block A-18 the program continues in accordance with which key on keypad 520 has been pressed by the subscriber. Separate loops are entered in respective blocks A-20, block A-22, and A-24. Pressing the "ChanUp" and/or "ChanDn" keys on keypad 520 (A-24) respectively increments and/or decrements the channel number on display 510 (A-30) and control returns to A-14. Repeated pressing of these keys may be used to select a desired channel.

If the "BUY" key is pressed (A-20) then the program causes microprocessor 501 to control display 510 to alternately flash the selected channel number and the two letters "bY" (A-26). The twenty-second timer is restarted at block A-26. The program then checks the twenty second timer in block A-32 to determine whether a time out has occurred. At this time, the subscriber may still change his mind about purchasing the premium event. If no further key is pressed by the subscriber (A-34), the twenty-second timer will time out and control is transferred to block A-10 where the microprocessor and display enter the sleep mode.

However, if a key is pressed before the twenty-second timer lapses, the program respectively determines whether a "BUY" key or a "CANCEL" key has been pressed in blocks A-36 and A-38. If the "BUY" key has been pressed, then microprocessor 501 causes transmission of the purchase data for that particular event to the interdication unit 20 (A-40). After the transmission of the buy message, control is transferred to block A-14. If, however, after selecting an event to buy, the "CANCEL" key is pressed (A-38), control is immediately transferred to block A-14 and no buy message is transmitted. In this manner, a simple transaction operation can be executed to buy a premium event and transfer associated billing information to the interdiction unit or to cancel the buy command prior to transmission.

The loop entered at block A-22 describes an operation whereby a buy which has been transmitted may be cancelled. When the "CANCEL" key on keypad 520 is pressed, the display alternately flashes the selected channel (A-28) and the letters "CA" to alert the subscriber that the cancel message is ready to be transmitted. The twenty-second timer is restarted and the program determines whether a key is pressed (A-44) prior to the timing out of the timer (A-42). If there is no confirmation of the cancel message by pressing of the "CANCEL" key (A-46), the program times out and control returns to block A-10 and the microprocessor and display to go into the sleep mode. However, if the initial cancel command is confirmed in block A-46 then the microprocessor controls the transmitter to transmit the cancel message (block A-48). After the microprocessor has transmitted the cancel message to the interdiction unit, the program returns to block A-14.

Preferably, a premium program may be purchased during a purchase window fixed by headend 10. For example, a subscriber may purchase an event in a purchase window beginning thirty minutes before the scheduled start of the program and ending ten minutes after the program start. A cancel window during which a subscriber may cancel a purchase may likewise be configured by headend 10.

Figure 7:
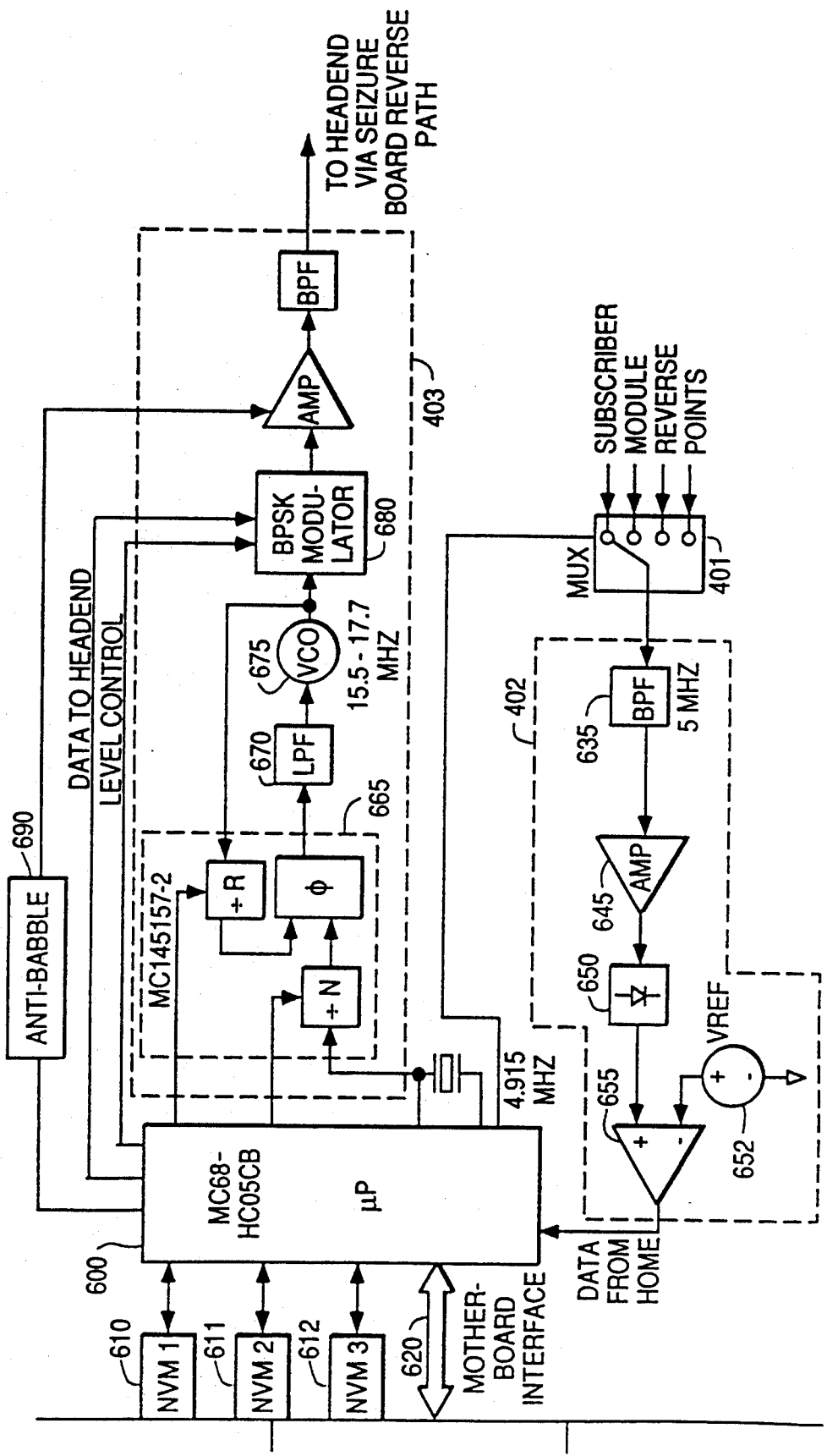
FIG. 7 is a schematic block diagram of a reverse path signal combining system according to the present invention for providing impulse pay-per-view and other special services, in which embodiment a subscriber possessing the transmitter of FIG. 5 may control off-premises equipment comprising the common circuitry of FIG. 2, the special service module of FIG. 6 and the subscriber module according to FIG. 3.

Referring now to FIG. 7, there is shown a block schematic diagram of a special service module such as an IPPV module of interdiction apparatus 20 which provides an RF data return path. The special service module of FIG. 7 comprises a signal multiplexer 630, a data receiver 402 (see FIG. 4) including elements 635, 645, 650, 655, a microprocessor 600 which may comprise on-board RAM and a data interface 620 with motherboard processor 260. In this embodiment, there is additionally included a transmitter 403 (see FIG. 4) including a BPSK modulator 680 for upstream data transmission.

The special service module of FIG. 7 is shown coupled between subscriber module equipment according to FIG. 3 including diplexer 395 and diplex filter 295 at the front end of common circuitry according to FIG. 2.

All return data communications for all services are assumed to be provided via the special service module of FIG. 7. Home shopping, subscriber polling, burglar alarm, pay per view and all other services are provided via the depicted circuitry and any associated data are relayed to headend 10 via transmitter 403. Microprocessor 600 in turn actuates a data transmission to, for example, relay stored data in one of three non-volatile memories 610–612 to headend 10 which had been previously transmitted by the subscriber terminal of FIG. 5 on a periodic basis. As an example of a reverse data direction, also consider a burglar alarm which may be activated on the subscriber premises. The alarm may be formatted and modulated for transmission at the subscriber's premises up the drop to the data receiver. The message then is interpreted as such by the microprocessor 600 which then controls the transmitter 403 to transmit an appropriate alarm message to the headend.

A subscriber via the terminal of FIG. 5 may control common circuitry or subscriber circuitry as appropriate, for example, an RF power amplifier 387 of a subscriber module according to FIG. 3. In a pay-per-view transaction, the common circuitry is signaled via interface 620 of the buy command. The processor 260 determines the authorization status of the subscriber and then authorizes the channel for the time of the event. When the event is to be displayed, the jamming oscillator for the associated channel is controlled so as to not jam that channel at the time of the paid for event.

RF data transmitter 403 may transmit data in accordance with well known techniques on any data carrier in the subsplit band, for example, between 5 and 30 megahertz. However, such PSK or FSK data transmissions have been notoriously susceptible to noise interference which has been practically impossible to avoid over time. Once a clear channel is uncovered, the next day, interference from, for example, a previously undetected ham radio operator precludes its use. In a preferred embodiment, and to avoid the noisy transmission path, the return data may be spread over a large portion of the spectrum and so travel secure and hidden in the noise.

A further alternative to spread spectrum, and one which alleviates its high cost, is to provide a plurality of data transmissions over a plurality of data channels spread over the entire return path spectrum comprising, for example, the T8 band. Thus, BPSK modulator 680 may be frequency controlled to alternately provide a number of separate data transmissions over any selected one of a plurality of separate data channels. To this end, frequency synthesizer circuit 665, for example, an MC145157-2 is provided to control a phase lock loop comprising additionally low pass filter 670 and voltage controlled oscillator 675 to output a particular transmit carrier frequency in the 15.5 to 17.7 MHz T8 band. Each data transmission is complete unto itself. Statistically, at least one such transmission on one channel is assured of reaching the headend 10 on any given day.

Connected between multiplexer 401 and microprocessor 600 is a bandpass filter 635 centered at approximately 5 MHz which may be identical to the bandpass filter 592 of FIG. 5. The data to be passed typically falls within the range of 4.920000 MHz plus or minus 75 KHz with an accuracy of about two per cent. Amplifier 645 amplifies the received signal from the transaction terminal of FIG. 5 just before detection at, for example, diode detector 650. The detected signal is compared at comparator amplifier 655 with a voltage reference provided by reference source 652. The output of comparator 655 is a serial data stream which is input to microprocessor 600.

The received data is interpreted at microprocessor 600 and forwarded via interface 620 to common circuit microprocessor 260 as appropriate. For example, microprocessor 260 is notified of any buy or cancel transaction initiated at a transaction terminal according to FIG. 5.

Data to be transmitted to the headend, for example, billing data responsive to a polling request, is forwarded over a line to BPSK modulator 680, more particularly described in U.S. Pat. No. 5,045,816. In accordance with the invention therein described, the frequency or gain of the BPSK data signal may be controlled from the headend to avoid noisy channels and to assure sufficient signal strength through the system. Frequency control is output to the divide by N and divide by R frequency dividers of frequency synthesis circuit 665. Gain control in a stepwise manner is provided via a level control lead to the BPSK modulator 680.

To prevent "babbling", excessive unwanted data transmissions, anti-babble circuit 690 is provided sensitive to microprocessor 600 and in accordance with U.S. Pat. No. 4,692,919.

Now the operation of the special service module will be described in some detail in regard to authorization of impulse pay per view events. The interdiction apparatus is advised of upcoming events by number, time and channel from the headend 10 via the addressable in-band or out-of-band system described above. The special service module, in turn, is told of the events by the motherboard microprocessor 260 over the motherboard interface 620, preferably a serial peripheral bus link interface. The special service module receives buy and cancel information from the transactions terminal of FIG. 5 in four subscribers' homes, which, in turn, may comprise up to four transaction terminals associated with four television receivers. The multiplexing circuitry 401 is controlled by microprocessor 600 to allow receipt of data from only one subscriber at a time. The microprocessor 600, for example, may scan the subscriber inputs in rapid fashion until data is sensed at one port. The switch then remains stationary at that position until the cessation of receipt of data. One multiplexer circuit which may be used comprises a 74 HCW052 integrated circuit.

The special service module determines if the buy or cancel is valid, and then causes the data, if valid, to be stored in non-volatile memories 610, 611, 612. Up to a certain number, for example, sixteen, thirty-two, or sixty-four, event purchases, including channel, event ID number, and time of purchase are stored in subscriber tables tabulated by subscriber identification or address. Each subscriber's table size may be controlled by the headend up to the maximum size, for example, thirty-two events. Upon polling, the special service module communicates the information to the motherboard via the motherboard interface 620. The motherboard microprocessor 260 then uses the information to signal the appropriate subscriber module microprocessor 300 to unjam the channel at the predetermined time of the event. Also, RF data transmitter 680, responsive to microprocessor 600, forwards billing data to the headend 10.

Messages from the transaction terminal need only comprise an operation code of predetermined length and a channel number. A check byte, i.e. parity, checksum, or error correcting codes may be used as appropriate. The microprocessor 600 identifies the source of the transmission via the position of multiplexer 630.

The motherboard interface transactions, that is between microprocessor 260 and microprocessor 600, are somewhat more complex. For convenience, microprocessor 260 may control or initiate all communications. The communications comprise the following: a status check, an address information message to advise of subscriber addresses, an authorization request to obtain channel authorization information, an authorization poll to obtain the present channel status, a message for controlling headend communication, and an NVM or RAM memory poll or request. In each such communication from the motherboard to the special service module, there is included at least an operation code. In others, there is included a channel number, an address, and/or data, as appropriate. Reply communications from the module to the motherboard microprocessor typically comprise responsive data or signals to the motherboard to request certain data.

Thus, in accordance with the present invention, a simple on-premises device is provided which provides a subscriber in a CATV interdiction system with IPPV capability. The subscriber terminal includes only a transmitter and thus does not receive commands or data from the interdiction apparatus. Data is entered into the subscriber terminal via a simple keyboard and the terminal is controlled by a small, inexpensive microprocessor. Accordingly, the benefits of impulse pay-per-view may be obtained in a CATV interdiction system without seriously compromising the cost benefits associated with the concept of removing apparatus from a subscriber's premises. Further, the problems associated with having multiple subscriber units coupled to the same drop are overcome by repeating buy and cancel messages at plural, random times.

Each of the above-identified U.S. Patents and applications are incorporated herein by the respective references thereto.

Variations and modifications in the herein described system and the equipment, within the scope of the invention, will be apparent to those skilled in the art. For example, the subscriber terminal may be addressed by a remote control such as an infrared remote. Additionally, although a two-digit LED display is disclosed, an LED or other type of display may be utilized to display time of day, credit limits, authorization codes, and the like. Accordingly, the foregoing description should be taken as illustrative and not in a limiting sense.

We claim:

1. A subscriber terminal for use in an off premises CATV system with impulse pay-per-view capability including a headend, at least one feeder cable connected to said headend, and an off premises unit connected to said feeder cable and coupled to said subscriber terminal over a communication link, said subscriber terminal comprising:
   inputting means for inputting subscriber-supplied signals indicative of a pay-per-view event to generate a message; and
   transmitting means responsive to the subscriber-supplied signals for periodically transmitting the message within a predetermined period of time to said off premises unit over said communication link.

2. The subscriber terminal in accordance with claim 1 wherein said communication link comprises a one-way communication link.

3. The subscriber terminal in accordance with claim 1 wherein said means for periodically transmitting includes means for periodically transmitting the message at random times within the predetermined period of time.

4. An off premises CATV system comprising:
   a headend for transmitting programming including pay-per-view programming;
   cable distribution means for distributing the programming;
   an off premises unit coupled to said cable distribution means for supplying the programming to at least one subscriber;
   a subscriber terminal coupled to said off premises unit by a communication link, said subscriber terminal including inputting means for inputting subscriber-supplied signals indicative of a pay-per-view event to generate a message;
   first transmitting means responsive to the subscriber-supplied signals for transmitting the message from said subscriber terminal to said off premises unit over said communication link;
   a memory at said off premises unit for storing the message from said subscriber terminal; and
   second transmitting means for transmitting the message stored in said memory to said headend.

5. The off premises CATV system in accordance with claim 4 wherein said communication link comprises a one-way communication link.

6. The off premises CATV system in accordance with claim 4 wherein said first transmitting means includes means for periodically transmitting the message within a predetermined period of time.

7. The off premises CATV system in accordance with claim 6 wherein said means for periodically transmitting includes means for periodically transmitting the message at random times within the predetermined period of time.

8. A method of providing impulse pay-per-view capability in a CATV system including a headend for providing programming including pay-per-view programming, at least one feeder cable connected to said headend for distributing the programming, an off premises unit connected to said feeder cable for receiving the programming and distributing the programming to at least one subscriber, and a subscriber terminal coupled to said off premises unit over a communication link, the method comprising the steps of:
   inputting subscriber-supplied signals indicative of a pay-per-view event into said subscriber terminal to generate a message; and
   transmitting the message periodically within a predetermined period of time to said off premises unit over said communication link in response to the input of said subscriber-supplied signals.

9. The method in accordance with claim 8 wherein said communication link comprises a one-way communication link.

10. The method in accordance with claim 8 wherein the step of transmitting comprises periodically transmitting the message at random times within the predetermined period of time.

11. The off premises CATV system in accordance with claim 4 wherein said memory is a non-volatile memory.

12. A method of providing impulse pay-per-view capability in a CATV system including a headend for providing programming including pay-per-view programming, at least one feeder cable connected to said headend for distributing the programming, an off premises unit connected to said feeder cable for receiving the programming and distributing the programming to at least one subscriber, and a subscriber terminal coupled to said off premises unit over a communication link, the method comprising the steps of:

inputting subscriber-supplied signals indicative of a pay-per-view event into said subscriber terminal to generate a message;

transmitting the message to said off premises unit over said communication link in response to the input of said subscriber-supplied signals;

storing the message in a memory at said off premises unit; and transmitting the message stored in said memory from said off premises unit to said headend.

13. The method in accordance with claim 12 wherein said communication link comprises a one-way communication link.

14. The method in accordance with claim 12 wherein the step of transmitting the message to said off premises unit comprises periodically transmitting the message within a predetermined period of time.

15. The method in accordance with claim 12 wherein the step of transmitting the message to said off premises unit comprises periodically transmitting the message at random times within the predetermined period of time.

* * * * *